April 21, 1931.    A. W. RUFF    1,801,693
HEAT EXCHANGER
Filed Aug. 23, 1929    2 Sheets-Sheet 1

Inventor
Alonzo W. Ruff
By Dodge and Sons
Attorneys

April 21, 1931.  A. W. RUFF  1,801,693
HEAT EXCHANGER
Filed Aug. 23, 1929  2 Sheets-Sheet 2
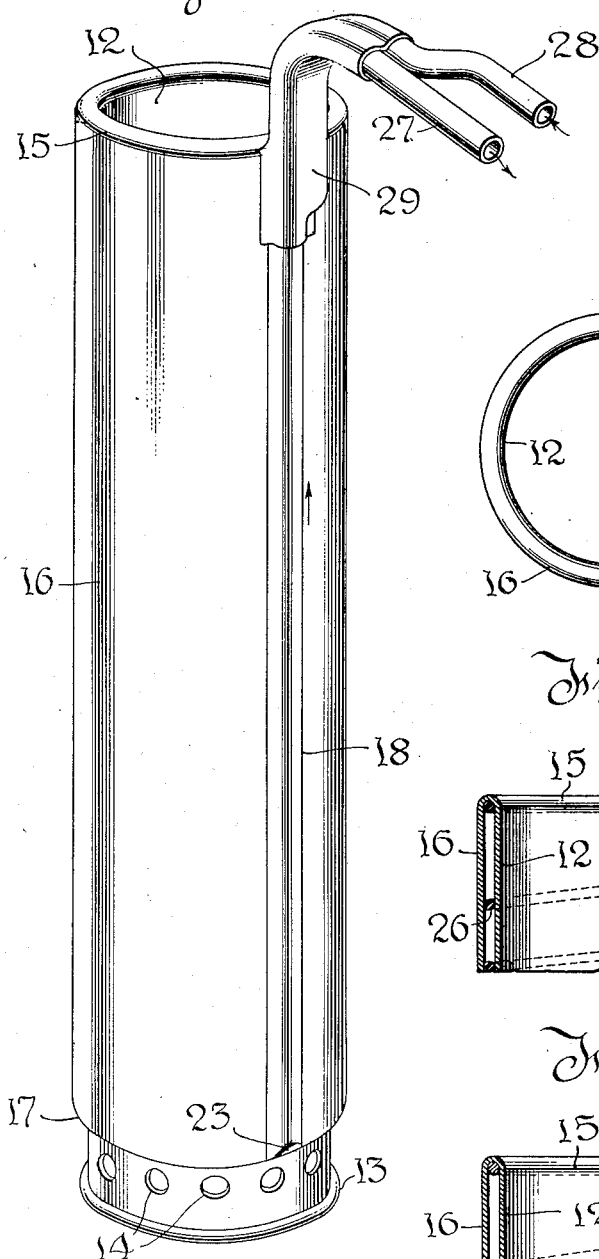
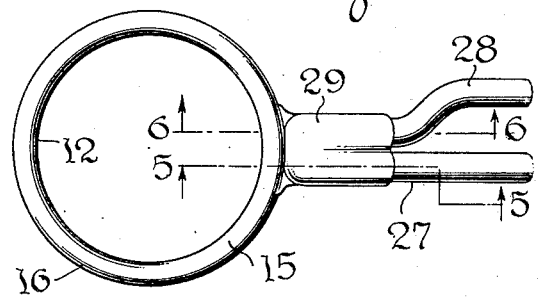
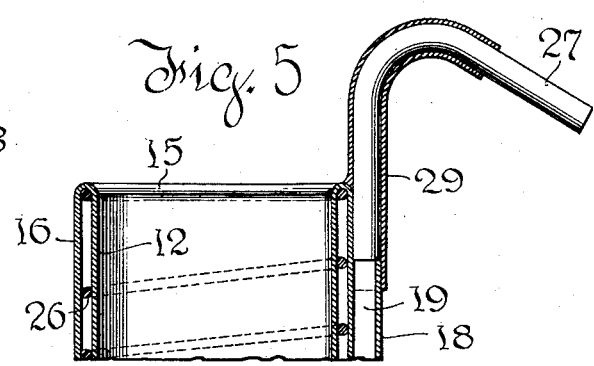
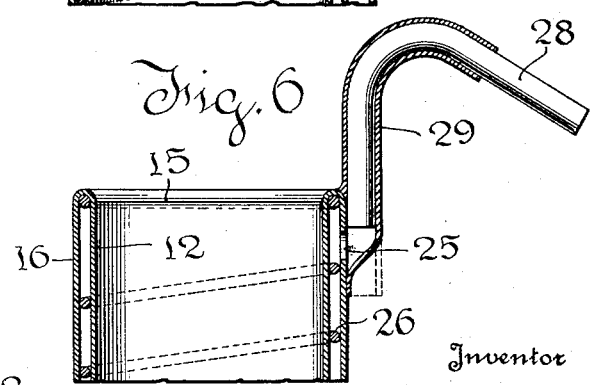
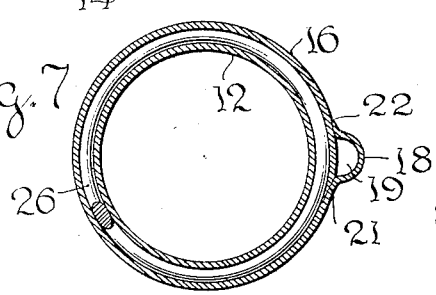
Inventor
Alonzo W. Ruff
By Dodge and Sons,
Attorneys Patented Apr. 21, 1931

1,801,693

UNITED STATES PATENT OFFICE

ALONZO W. RUFF, OF YORK, PENNSYLVANIA, ASSIGNOR TO YORK ICE MACHINERY CORPORATION, OF YORK, PENNSYLVANIA, A CORPORATION OF DELAWARE

HEAT EXCHANGER

Application filed August 23, 1929. Serial No. 387,997.

This invention relates to heat-exchange and particularly to so-called "milk coolers", used on dairy farms and elsewhere to cool milk and other liquids while being poured or strained into cans, or for cooling the milk while held in cans. The device might be used for heating, but its largest field is cooling, and it will be described as applied to cooling milk.

The invention provides a liquid cooled element specially designed to be inserted into milk cans and similar receptacles. It is thus capable of cooling or maintaining cool the contents of the can. Further, by use with a special distributor element it is adapted to cool milk rapidly as the latter is poured into the can. A strainer element is provided and arranged for use in conjunction with the distributor. Any suitable cooling liquid may be used. The parts are so designed as to be sustained by the neck of the can.

The preferred embodiment of the invention is illustrated in the accompanying drawing, in which,—

Fig. 3 is a perspective view of the cooler.

Fig. 4 is a plan view thereof.

Fig. 5 is a section on the line 5—5 of Fig. 4.

Fig. 6 is a section on the line 6—6 of Fig. 4.

Fig. 7 is a section on the line 7—7 of Fig. 1.

Figures 1, 2:
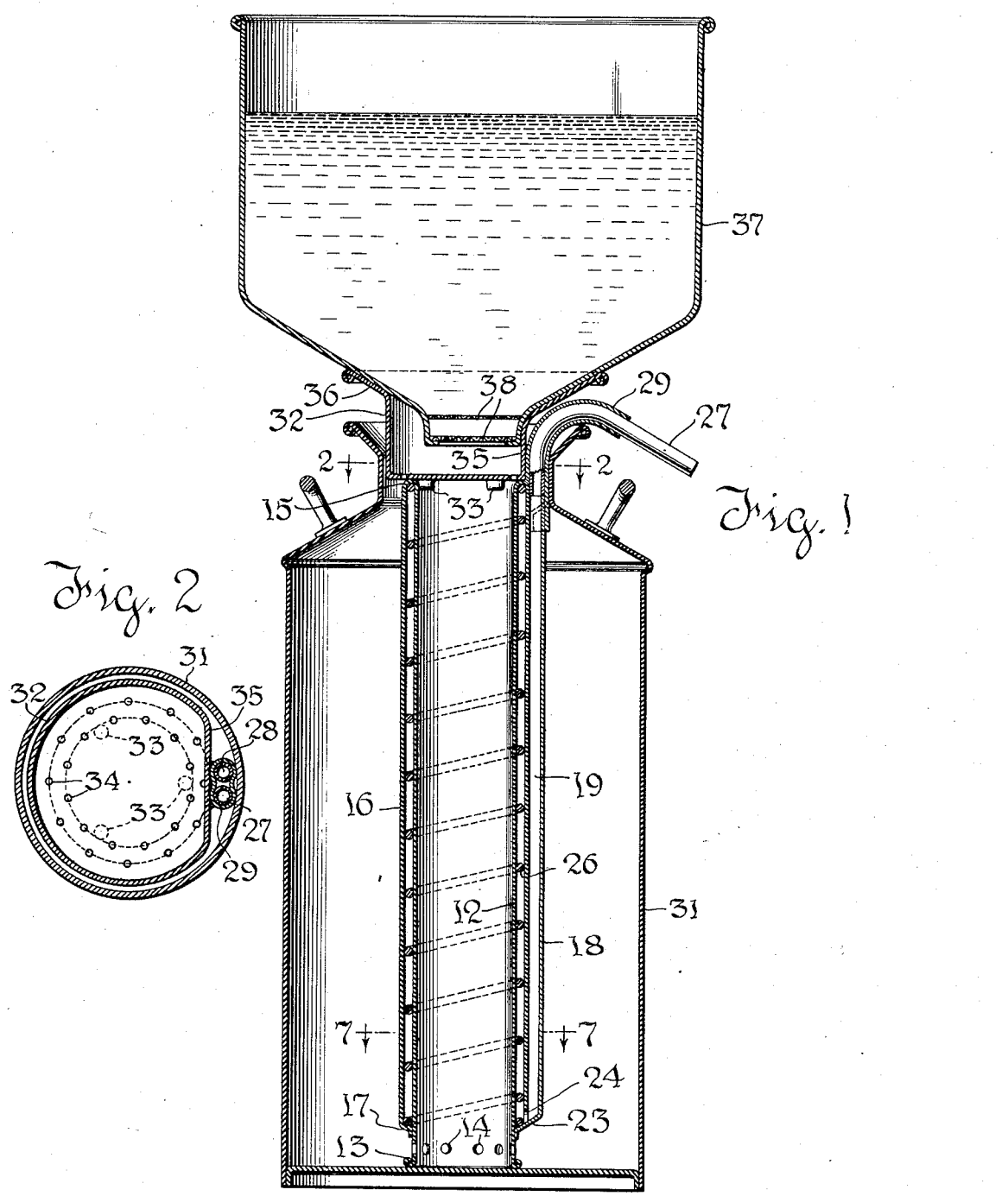
Fig. 1 is a vertical axial section of the cooler, distributor and strainer, in position in a milk can.
Fig. 2 is a section on the line 2—2 of Fig. 1.

The cooling unit comprises a long double walled tubular element, the space between the double walls serving as a jacket space for the cooling liquid. It is made up of sheet metal and tubing preferably as follows:

The inner wall is a tube 12, preferably of copper. At the lower end it has an out-turned rolled rim or bead 13 to reinforce it. A short distance above the bead 13 are the apertures 14 for the passage of milk or other liquid to be cooled. At the upper end the tube 12 is flanged or spun outward as indicated at 15 and there soldered or otherwise connected with the tubular envelope 16 which is flanged inward to meet it, forming a smooth butt joint.

The outer envelope or shell 16 is formed of sheet metal, preferably of copper, and is flanged inward at its bottom, as shown at 17, to embrace the tube 12 closely just above the openings 14. A tight joint is here secured between the tube and shell by soldering or the equivalent. The envelope 16 is formed with a special lap joint provided with an offset 18 which forms a longitudinal tube or duct 19. The lap joint is soldered on each side of the duct as clearly indicated at 21, 22, in Fig. 7, and the lower end of the duct is closed, as shown at 23. An opening 24 leads from the duct 19 to the space between tube 12 and envelope 16.

The duct 19 extends upward from opening 24 to a point near the upper end of the cooling unit, and adjacent and to one side of the upper end of the duct 19 is a second opening 25 through the envelope 16. A wire 26 coiled in a helix is mounted in and bridges the interval between tube 12 and envelope 16, forming a helical flow passage from the opening 25 to the opening 24. The ends of the wire serve as reinforcements for the annular soldered joints at the top and bottom of the envelope, and at these end joints the end portions of the wire are soldered in place substantially completely around the tube 12. It is not necessary to solder the intermediate portions of the wire, but it can be attached by sweating or spot welding, if desired.

A pair of bent tubes 27 and 28 form the connections to the duct 19 and opening 25 respectively. The lower end of tube 27 abuts the upper end of offset 18 (which forms duct 19, see Fig. 5) while the lower end of tube 28 is slightly above the opening 25 (see Fig. 6). The tubes are embraced by a special sleeve or fitting 29 which isolates them from each other and connects one watertight to duct 19 and connects the other with opening 25. The fitting 29 is soldered in place and not only assists in making the connections but also braces the pipes 27 and 28.

Pipe 28 is preferably the inlet connection, though the connections may be made either way. Water, naturally or artificially cooled, or any other suitable fluid, may be fed by a flexible hose (not shown), to pipe 28. It flows thence through opening 25, downward in a spiral path defined by tube 12, envelope 16 and wire 26, through opening 24, and thence via duct 19 to pipe 27. Ordinarily a second hose would be connected to pipe 27 and carry away the discharging liquid.

The cooler is inserted through the neck of a milk or other can 31 (see Fig. 1) and may be used for general cooling purposes. The cooler does not protrude from the neck of the can and hence a cover, (not shown) having a suitable opening for fitting 29, may be applied to the can.

To use the cooler for quick cooling while filling a can, a distributor is used to feed the inflowing milk or other liquid to be treated down the inner and outer surfaces of the cooler. This distributor, indicated generally at 32, is a cup-like member which fits into the neck of the can and has bosses 33 on its bottom to center the distributor on the top of the cooler. The distributor has two concentric series of holes 34 in its bottom; one serves to deliver liquid to the inner and the other to the outer cylindrical face of the cooler. A flattened portion 35 offers clearance for the fitting 29. The distributor 32 has a flaring top 36 to receive and support a funnel 37 provided with gauze strainers 38.

When the milk or other liquid is poured into the can it trickles down the surfaces of the cooler and gives up its heat quite rapidly, particularly if an artificially refrigerated cooling liquid be used.

While the form above described in considerable detail is preferred, it is susceptible of modification within the scope of the invention. While primarily intended for cooling, the device may be used for heating liquids or maintaining them hot, and may be used with various receptacles.

What is claimed is,—

1. A heat exchanger comprising two tubular members one within the other with an intervening space, said members being connected together at their ends to enclose said space, one of said members being formed with a longitudinal lap seam, enclosing a duct communicating with said space; and liquid conducting connections to said duct and directly to said space.

2. A heat exchanger comprising two tubular members one within the other with an intervening space, said members being connected together at their ends to enclose said space, one of said members being formed with a longitudinal lap seam, enclosing a duct communicating with said space; liquid conducting connections to said duct and directly to said space; and a spiral baffle spanning the interval between said tubular members and connected at its ends to said members.

3. A heat exchanger comprising two tubular members one within the other with an intervening space, said members being connected together at their ends to enclose said space, one of said members being formed with a longitudinal lap seam, enclosing a duct communicating with said space; liquid conducting connections to said duct and directly to said space; and a spiral baffle spanning the interval between said tubular members, and at its ends encircling said inner member and reinforcing the end joints between said tubular members.

4. A combined trickler and insertion cooler for use in milk cans and like receptacles, comprising a hollow-walled tubular element, open at both ends, and adapted for insertion into a receptacle; means within the hollow walls of said element defining a flow path from end to end of the element; means for supporting said element in an upright position within a receptacle, and adapted to permit flow of the contents of the receptacle beneath the lower end of the tubular element; means at the upper end of said element for conducting liquid to and from the hollow interior thereof; and a distributor removably mounted on the upper end of said tubular element, and adapted to direct liquid over the internal and external faces of the tubular element as the liquid is being poured into the receptacle.

In testimony whereof I have signed my name to this specification.

ALONZO W. RUFF.